Jan. 12, 1960  H. BERGER ET AL  2,921,202
X-RAY APPARATUS

Filed July 18, 1958  5 Sheets-Sheet 1

Inventors
Helmut Berger and
Johann Finkenzeller
By
Atty.

Jan. 12, 1960 H. BERGER ET AL 2,921,202
X-RAY APPARATUS
Filed July 18, 1958 5 Sheets-Sheet 3

Inventors
Helmut Berger and
Johann Finkenzeller
By
atty.

Inventors
Helmut Berger and
Johann Finkenzeller
By [signature]
atty.

Inventors
Helmut Berger and
Johann Finkenzeller
By
atty.

United States Patent Office 2,921,202
Patented Jan. 12, 1960

2,921,202
X-RAY APPARATUS

Helmut Berger and Johann Finkenzeller, Erlangen, Germany, assignors to Siemens-Reiniger-Werke, Aktiengesellschaft, Erlangen, Germany Application July 18, 1958, Serial No. 749,501

Claims priority, application Germany July 26, 1957

3 Claims. (Cl. 250—105)

The invention relates to an X-ray apparatus with devices for depicting objects, such as the seats of disease (nidus), on layers sensitive to X-rays. In such devices means are provided which restrict the primary X-rays depicting the object, to the actual size of the sensitive layer, for example of an X-ray film, or according to the size of the dark slide or cassette holding the film. For limiting the cone of X-rays, screening devices are provided with adjustable screening or diaphragm plates made from radiopaque material. The screening devices are arranged in a tubular member connected with the housing of the X-ray tube. In the case of X-ray apparatus in which the radiographs are produced after previous viewing of the object image thrown on a luminous screen by means of the X-rays, an X-ray cassette being fitted between the fluorescent or luminous screen and the object (patient), devices for limiting the primary X-ray cone are as a rule also arranged on the carrier on the luminous screen and the film cassette. X-ray pictures with previous viewing on a luminous screen are frequently known as target pictures and the carrier means for the luminous screen and slip-in cassettes as target apparatus. Target pictures are frequently taken of a part of the object, a series of pictures being taken on an X-ray film which is exposed in sections. In this case the beam of X-rays is generally masked to the size of the part-picture with the screening devices provided on the target apparatus.

When using the target system not only the size of the film but also the dividing up of the film size for a series of part-pictures is frequently changed. The routine work on a target apparatus is rendered difficult for the examining doctor if he, after each viewing on the luminous screen on which the primary X-ray radiation is masked for the whole surface of the luminous screen, has to adjust the screening device arranged on the X-ray tube housing or on the target apparatus according to the size of the cassette actually being used or, when taking part-pictures, according to the part exposure. As the doctor has to work in a dark room, the difficulties are particularly great when adjusting the screening device.

In order to overcome the above-mentioned difficulties it is an object of the present invention to provide means for automatically adjusting the screening device restricting the X-ray radiation (the picture field), and to make these means adjustable in dependency upon the size of the X-ray film cassette actually inserted.

In the case of exposure of an X-ray film in sections, when a series of pictures are produced on the film, the X-ray film cassette is stopped with the aid of holding means in the different positions for making the exposures. The holding means, for example mechanical abutments or stops, are generally provided on an adjustable carrier, a suitable series of stops being coordinated to the different cassette sizes and series of pictures and arranged so that they can be set in advance.

According to another object of the invention means are provided for automatically adjusting the screening device, which means are controllable according to the setting of the series of stops in question.

The setting of the series of stops can be effected by automatically operating means which can be controlled according to the size of cassette actually inserted. The means for setting the series of cassette stops and the means for adjusting the screening device can be jointly controlled according to the size of the inserted cassette. For example an adjustable part of the cassette inserting device can serve both for controlling the screening device and also for automatically setting the cassette holding means.

Several preferred embodiments of the invention are illustrated by way of example in the accompanying drawings in which.

Figure 1:
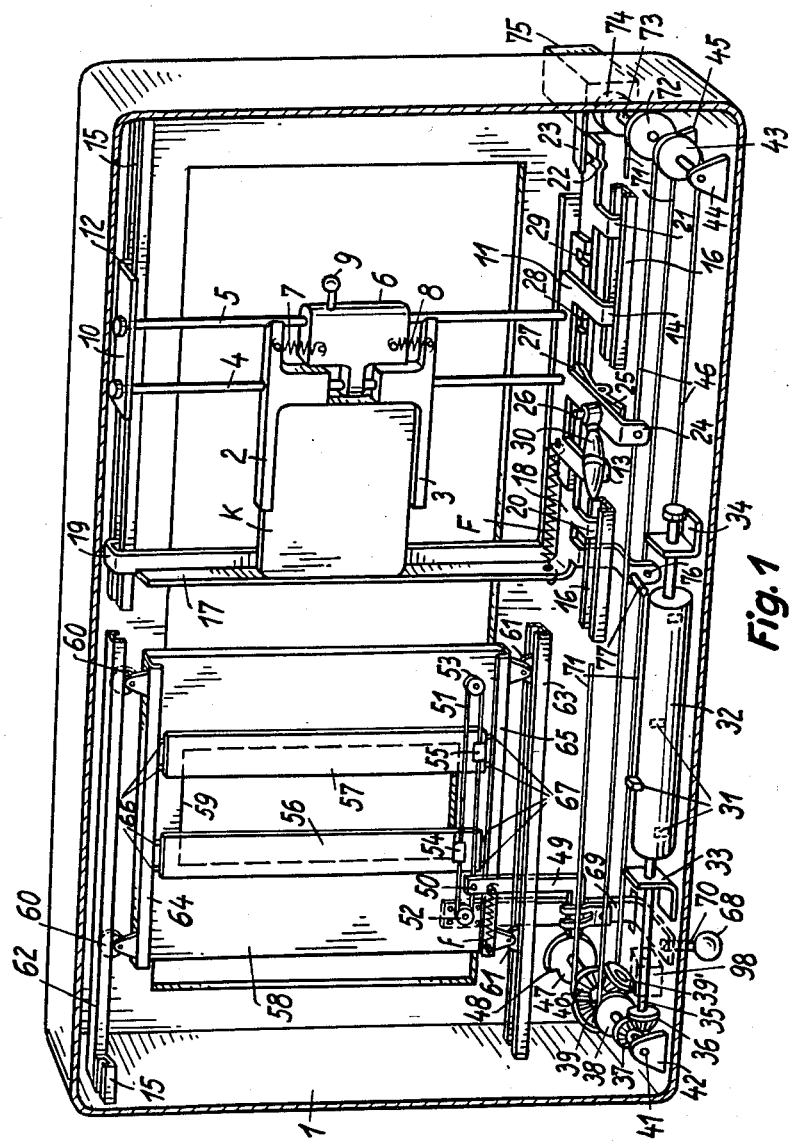
Fig. 1 shows an X-ray target picture apparatus, partly in elevation and partly in section.

The X-ray target picture apparatus illustrated in Fig. 1 comprises a rectangular housing 1 with the front wall directed towards the viewer removed. A cassette carriage is provided in the interior of said housing 1 and is adapted for taking all standard sizes of film. This cassette carriage is clamped both in transverse and also in vertical position between adjustable arms 2 and 3 which in turn are coupled by means of tension springs 7 and 8 with a carrier 6 slidable on guide rods 4 and 5. The carrier 6 can be arrested in any desired position on the guide rods 4 and 5 by means of a locking device capable of being brought into engaging or disengaging positions by means of an operating element 9. The guide rods 4 and 5 are fixed on an upper guide part 10 and a lower guide part 11 and slidable by means of guide members 12, 13 and 14 on guide rails 15 and 16 fixed in the housing 1.

A cassette K actually inserted in the cassette carriage or the cassette carriage itself can be brought to bear against a slip-in frame which has a lateral strip 17 and a bottom strip 18 and is also slidable on the guide rails 15 and 16 by means of guide members 19, 20 and 21. The slip-in frame can be stopped in the ready-position by means of a stopping device 22, 23. The cassette carriage can be coupled with the slip-in frame by means of a stopping device in that a catch member 25 is pivoted on a carrier arm 24 and can be operated by means of a press-button 26 to engage in recesses 27, 28 and 29 provided in the bottom strip 18. A handle 30 is mounted on the carrier arm 24 and serves for shifting the cassette carriage and the slip-in frame coupled therewith and for guiding the press-button 26. The two cooperating parts, cassette carriage and slip-in frame, at the same time measure the size of the cassette in the slip-in direction. The cooperation of the cassette carriage with the slip-in frame can be controlled by a tension spring F fixed on the lateral strip 17 and the lower guide part 11, which spring automatically moves the cassette carriage towards the slip-in frame.

Separate from the cassette carriage are cassette holding means in the form of stops or abutments 31 mounted on a common tubular carrier 32 and distributed according to the sizes of the cassettes used and the series of pictures, which carrier 32 is rotatably mounted in brackets 33 and 34 on the bottom wall of the housing 1. The tubular carrier 32 is coupled by means of a shaft 35 and bevel gears 36 and 37 with a differential gear system 38, 39, 39' and 40 driven by a shaft 41 which is rigidly connected with planet wheels 39, 39' and mounted on the bottom wall of the housing 1 by means of brackets 42. An endless cord 46 is guided over the wheel 38 of the differential gear system and a pulley 43 corresponding with this wheel 38 is also mounted on the bottom wall of the housing 1 by means of brackets 44, 45, and is clamped to the carrier arm 24. After the insertion of the cassette K between the arms 2 and 3, the cassette carriage is brought into the relative position in relation to the slip-in frame necessary for the exposure, whereby the distance of the cassette carriage from the slip-in frame at the same time determines the size of the cassette for the picture, and the wheels 38, 39 of the differential gear system and through these the bevel wheels 37, 36 and consequently the tubular carrier 32 are adjusted by the endless cord 46 in such a manner that the abutments or stops corresponding to the size of the cassette actually inserted are brought into operating position for the series of pictures to be made.

A circular disc 47 is coupled with the carrier 32 of the cassette holding means through the intermediary of the shaft 41 of the differential gear system, and has a cam-shaped part 48 which acts on a slide 49 attached at 50 to an endless cord 51 which is guided over pulleys 52 and 53 and at 54 and 55 to screening plates 56 and 57 of radiopaque material. The slide 49 can be positively secured to the cam-shaped part 48 by means of a tension spring f. The two screening plates 56 and 57 are slidable on a plate 58 of radiopaque material along guide rails 64 and 65 by means of rollers 66 and 67. The plate 58 has an aperture 59 and is slidable on guide rails 62 and 63 secured longitudinally of the housing 1 by means of rollers 60 and 61. The screening plates 56 and 57 are adjustable in front of the aperture 59 by means of the cam-shaped part 48 by an amount corresponding to the set cassette holding means or the set cassette size so that when setting the cassette holding means the exposure field limited by the screening plates 56 and 57 is automatically adjusted at the same time. The plate 58 can be shifted out of the ready-position into the exposure position by means of a handle 68 which is connected with an angle-piece 69 fixed on the plate, and stopped in operating position by means of a pin 70 which can engage in an aperture provided in the bottom wall of the housing 1.

In order to maintain the adjustment of the cassette holding means previously set by means of the cassette carriage and also the screens for the exposure field, a second endless cord 71 is provided which is guided over the wheel 40 of the differential gear system and over a pulley 72. This pulley 72 is keyed on a shaft 73 of a gear system 74 which can, if necessary, be driven by an electromotor 75. The cord 71 is connected to an angle-piece 76 fixed on the bottom strip 18 of the slip-in frame, an abutment 77 being also provided on the angle-piece 76, which cooperates with the stops or abutments 31. Whereas the carrier arm 24 is connected to the upper stretch of the cord 46, the angle-piece 76 is connected to the lower stretch of the cord 71 so that, as the cassette carriage is introduced, the two wheels 38 and 40 of the differential gear system rotate in opposite directions and consequently the shaft 41 of the differential gear system is not turned.

Figure 2:
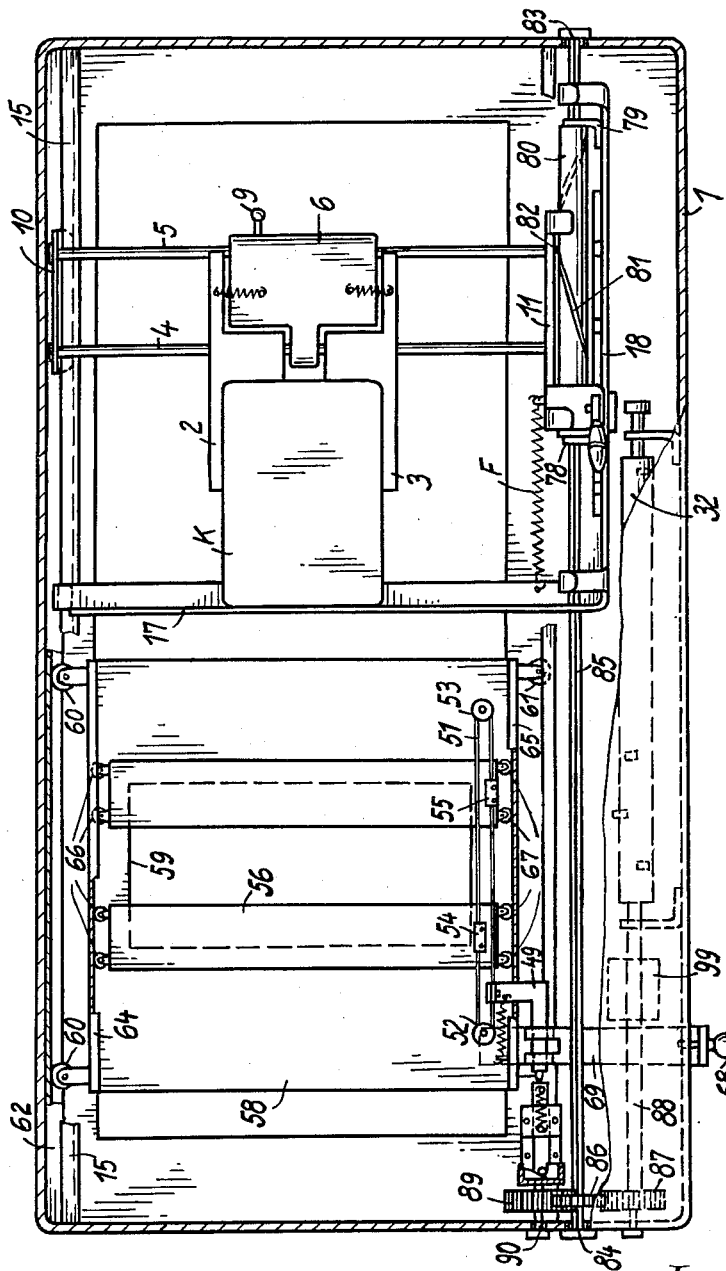
Fig. 2 is an elevation showing a cassette inserting device.
Figure 3:
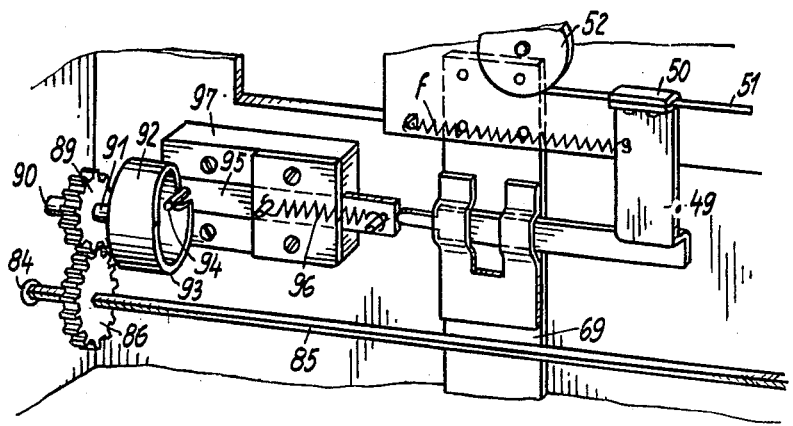
Fig. 3 shows a portion of the cassette inserting device of Fig. 2 on a larger scale.

In the form of construction illustrated in Figs. 2 and 3 the cassette carriage, the screening out device as well as the carrier for the cassette holding means are constructed and arranged in a manner analogous to that of the example illustrated in Fig. 1 and consequently are not here described in detail. The adjustment of the cassette holding means to the series of pictures coming into question is again effected according to the size of the cassette introduced by an adjustable part of the cassette carriage, namely by the adjustable cassette holding means, with the aid of a selecting device which comprises a tubular body 80 rotatably mounted in brackets 78 and 79 on the bottom strip 18 of the slip-in frame. The tubular body 80 is provided with a groove 81 in which a pin 82 fixed on the lower guide part 11 engages. The groove 82 is so constructed and arranged that, by means of the pin 82, the tubular body 80 is turned an amount corresponding to the size of cassette actually introduced. Concentric with the tubular body 80 a square shaft 85 is arranged rotatably mounted at 83 and 84 in the housing 1, which shaft 85 is in positive operative connection with the tubular body 80. When the tubular body 80 turns, the square shaft 85 also turns and at the same time adjusts a toothed wheel 86 fixed on the left end of the square shaft 85 and in mesh with a toothed wheel 87 fixed on a shaft 88 of the tubular carrier 32.

Another toothed wheel 89 on a shaft 91 is in mesh with the toothed wheel 86 and is rotatably mounted at 90 in the left-hand wall of the housing 1. On the shaft 91 (Fig. 3) of this toothed wheel 89 a tubular body 92 is fixed which has a cam 93 on one end face. Engaging this cam 93 there is a pin 94 which is fixed on a slide 95, the pin 94 being non-positively maintained in contact with the cam 93 by means of a spring 96. The slide 95 is guided in a part 97 fixed on the rear wall of the housing 1 and supports the spring 96. The slide 95 is operatively connected with the slide 49 provided in the example illustrated in Fig. 1 and which is slidably guided in the angle piece 69. Also in this case the adjustment of the plates restricting the exposure field takes place automatically in dependency upon the set cassette holding means or the set cassette size.

It goes without saying that, without departing from the scope of the invention, the automatic adjustment of the exposure field screening plates can also be effected by a manually adjustable cassette holding means, for example an abutment or stop carrier, in that, for example, the abutment carrier is coupled with the means for automatically adjusting the screening plates.

The tubular carrier 32 is not rigidly connected with the driving means (bevel gears 36 and 37 in Fig. 1 or toothed wheel 87 in Fig. 2) but is coupled with the driving means through the intermediary of a stepping mechanism merely indicated diagrammatically at 98 in Fig. 1 and 99 in Fig. 2 and which is neither illustrated nor described as it does not constitute part of the invention above-described, which stepping mechanism enables the carrier 32 to be moved on separately, independently from the said driving means for the purpose of engaging and disengaging the abutments or stops provided for the series of pictures in question.

In the case of target apparatus in which parts of the cassette holding means are differently adjustable according to the shape of the inserted cassette, the adjustable holding means engage a stop according to the width of the inserted cassette, which stop automatically limits the insertion of the cassette in such a manner that the middle of the cassette is located in the central ray of the X-ray beam before the exposure is made. In a similar manner the holding means adjustable according to the size of the cassette can, according to the invention, control electric potentiometers which, through the intermediary of a remote control, control motor-driven screen plates of a primary X-ray diaphragm according to the size of the inserted cassettes. Thus the two screening plates with vertical boundary edges are controlled by the controlling means variable with the width of the cassette. For the two other screening plates with boundary edges extending at right angles to the first mentioned edges, no special controlling means which scan the actual height of the cassette are necessary according to the invention if only a certain height is selected for the width measurement of each inserted cassette. If the generally used cassettes of different sizes are changed both in broadside and also in upright shape, that means that each cassette dimension (cassette width and cassette height) of the set of cassettes provided should only occur once. In the case of the standard series of cassettes for film sizes 13 x 18, 18 x 24, 24 x 30, and 36 x 36 cms., this is attained for example by enlarging the external measurements (width and height) of the cassette for the film size 18 x 24 by 1 cm. in each case. It is then sufficient to determine the width measurement of the inserted cassette in order to set from this characteristic magnitude both the two vertically extending and also the two horizontally extending screening plates according to the previously selected external size.

Figure 4:
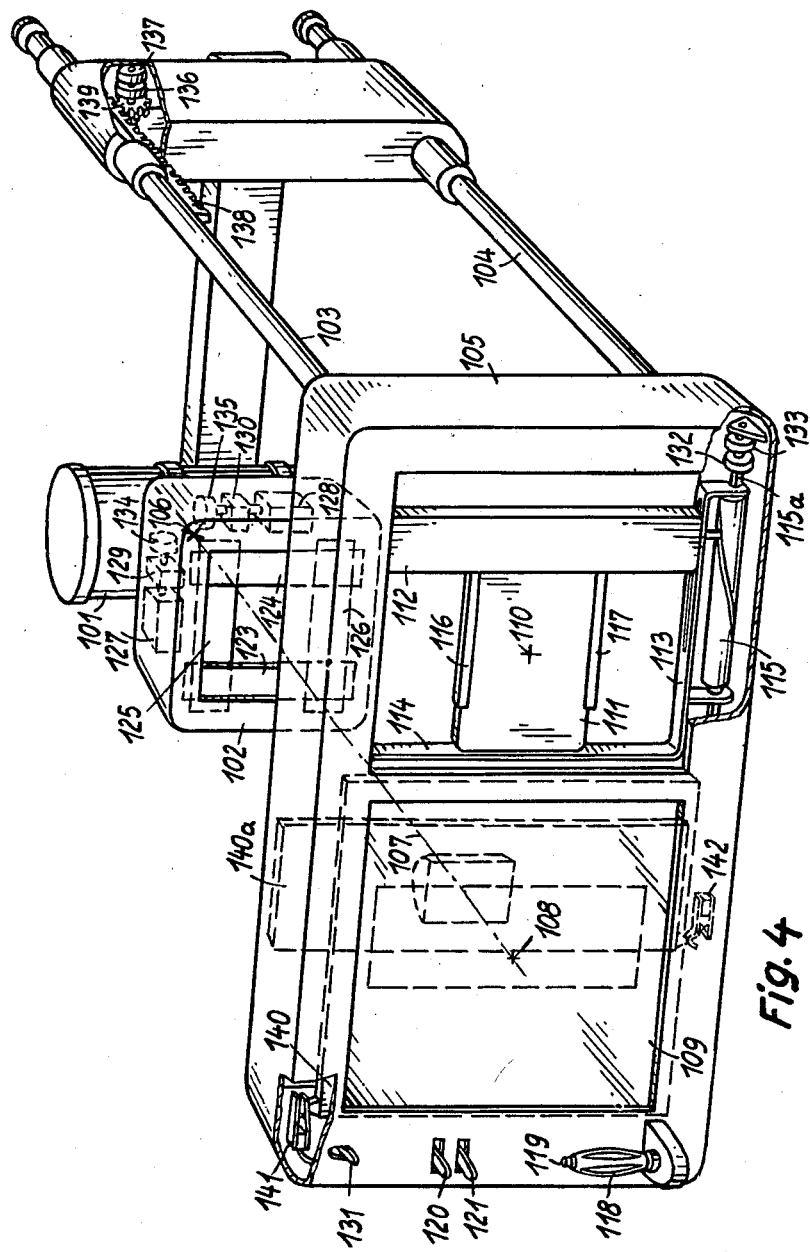
Fig. 4 is a perspective view of parts of an X-ray apparatus which are essential for explaining the invention.
Figure 5:
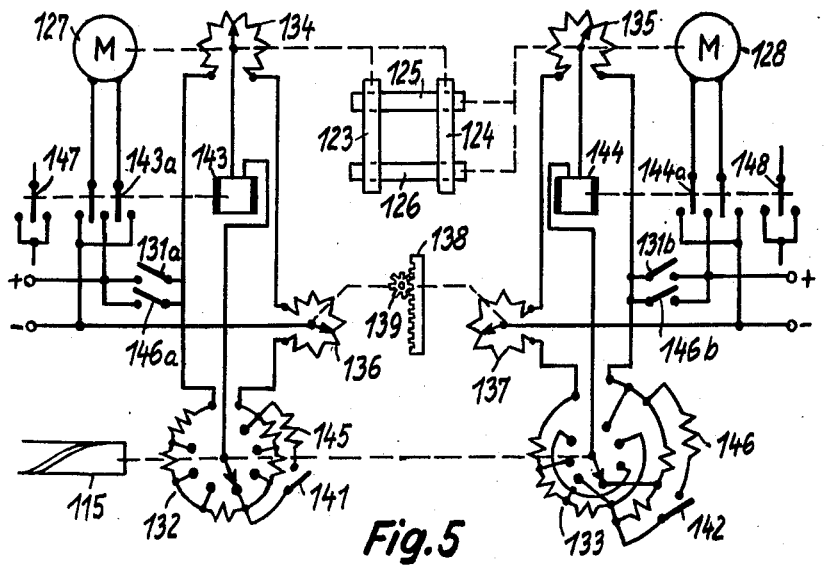
Fig. 5 is a diagrammatic view of parts of the target apparatus.
Figure 6:
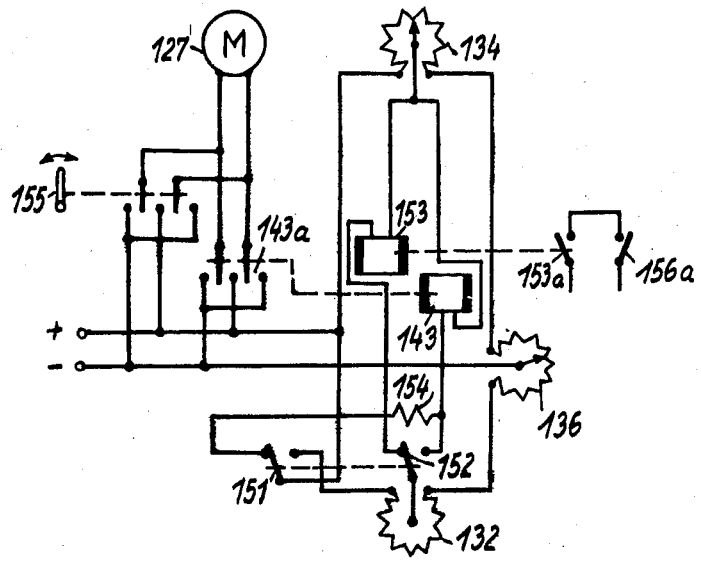
Fig. 6 is a circuit diagram of the apparatus.

In the form of construction illustrated by way of example in Figs. 4 to 6 only the parts of an X-ray apparatus are shown which are incorporated in the invention. According to Fig. 4, an X-ray tube protecting housing 101 is connected to the frame 105 of a target apparatus with a screening or diaphragm housing 102 through the intermediary of arms 103 and 104. The central ray 107 indicated by dot and dash lines, emanating from the focus 106 of the X-ray tube always remains directed on the center 108 of the luminous screen 109. The center 110 of the cassette 111 inserted in the target apparatus is introduced to the center 108 of the luminous screen for producing a central picture. For this purpose a slidable part 112 which in a cassette frame 113 presses the cassette 111 against the left edge 114 of the frame, according to Fig. 4, controls a helical guide 115 by which an abutment member, not shown in the drawings, is set for limiting the insertion of the cassette frame 113 before the exposure. The cassette holding members 116 and 117 produce in known manner a centering of the center of the cassette in relation to the vertical, independently of the height measurement of the cassette. On the left-hand part of the frame 105 of the target apparatus are two levers 120 and 121 situated above a handle 118 with an exposure release knob 119, which levers serve in known manner for the mechanical adjustment of the pairs of diaphragm blades or plates 123, 124 and 125, 126 by means of the motors 127 and 128 and gear systems 129 and 130 illustrated diagrammatically in the drawings.

These motors 127 and 128 are, according to the invention, to be controlled additionally by control voltages when a switch 131 is brought into a position "automatic diaphragm setting," which voltages are dependent upon the width and height measurements of the cassette introduced. These voltages are received from potentiometers 132 and 133 which are set by the helical guide 115 according to the position of the part 112. This helical guide 115 is arranged longitudinally shiftable on a square rod 115a which is coupled with the adjustment axles of the potentiometers 132 and 133. Potentiometers 134 and 135 coupled with the motors 127 and 128 cooperate with the potentiometers 132 and 133 in a bridge connection with control relays, in the manner hereinafter explained.

Additional control potentiometers 136 and 137 for the diaphragm or screen motors 127 and 128 are set by gearing 138 and 139 in changing the distance between the X-ray tube and the target apparatus, in order, in the case of a variation of the distance between X-ray tube and target apparatus, to keep constant the cross section of the beam in the plane of the target apparatus.

When dividing the cassette size up for two or more part-pictures taken side by side, one above the other and one after the other on the same film, the actual overall size of the film is of major importance. In the known target apparatus which enable such part-pictures to be taken, a subdivision into sections of the same size always takes place and provision is made for bringing the different sections successively into alignment with the center of the central ray for exposing the film. Therefore a uniform diaphragm or screen adjustment is sufficient for the series of pictures.

In the target apparatus shown in Fig. 4 a screen plate 140, indicated in dash lines, is provided with an aperture 12 cms. in width, with the aid of which it is possible to take successively two juxtaposed pictures with a cassette 18 x 24 cms. introduced broadside or transversely. When moving this screen plate into position for taking a picture, a switch 141 is closed which shifts the screening plates 123 and 124 according to the width of the aperture in the screen or diaphragm plate 140.

A switch 142 is also located in the frame 105, which switch is actuated on the introduction of a compression tube 140a and ensures that the X-ray beam is screened to an area corresponding to the aperture of the tube in the manner hereinafter described.

The manner in which the electrical part of the arrangement operates will be hereinafter described with reference to the circuit diagram illustrated in Fig. 5. The motors 127 and 128 can be switched to rotate in different directions by polarized relays 143 and 144 with the aid of switch-over contacts 143a, 144a. The windings of these relays 143 and 144 are located in the neutral arm of the bridge arrangements with the above-mentioned potentiometers 132 and 133 and 134, 135 respectively. The taps of the potentiometers 132 and 133 are displaced by the helical groove controlled according to the size of the cassette in the manner illustrated in Fig. 4. As long as there is a difference in voltage between the taps of the potentiometers 132 and 133 and the taps of the potentiometers 134 and 135 coupled with the motors 127 and 128, the relays 143 and 144 are energized in one or other direction, according to the sense of this difference, and the motors are started up in the corresponding directions of rotation. The voltage feed to the resistance bridge takes place over the adjustable taps of the potentiometers 136 and 137. When the taps of these potentiometers are adjusted by the gearing 138 and 139 in the event of a change in the distance between the X-ray tube and the film, the equilibrium of the bridge is upset and the motors readjust the aperture of the near-focus diaphragm to the necessary extent.

The potentiometers 132 and 133 are divided in stages or steps according to the existing film widths or heights and consist of series-connected separate resistances. As it is possible to introduce into the holder a cassette either broadside or upright, the resistance steps or stages of the potentiometers 132 and 133 become operative one after the other in the switching operation illustrated in Fig. 5, wherein the standard cassette sizes for films 13 x 18 cms., 18 x 24 cms., 24 x 30 cms. and 36 x 36 cms. are taken as basis. So that there is a clear relationship between the width and height measurements of the inserted cassette, the cassette 18 x 24 is provided with an edge widened by 1 cm., so that the switching arrangement has only to determine the width measurements of the cassette which would correspond to the following film width measurements: 13, 18, 19, 24, 25, 30 and 36 cms. The setting of the vertical screening or diaphragm plates 123 and 124 is however the same for the width measurements 18 and 19 and also for 24 and 25 because in these cases the same film widths actually exist. The full film height measurements 18, 13, 24, 30, 18, 24 and 36 cms. must then be co-ordinated to these width measurements in the same sequence. The resistance values introduced in the bridge arrangement as the potentiometer 133 moves forward, must change according to this series of measurements.

By means of the switch 141 which is actuated by the screening plate 140 with an aperture of 12 cms. in width, a resistance 145 is switched into the bridge arrangement for the motor 127 set according to the film width measurement of 24 cms., so that, through the resultant change in potential, the vertical screening plates 123 and 124 are shifted a distance equal to half the width of the inserted cassette.

The switch 142, closing on the introduction of the tube 140a (Fig. 4), switches in a similar manner a resistance 146 into the bridge arrangement of the motor 128 so that the horizontal screening plates 125 and 126 are adjusted according to the height of the tube 140a which differs by 9 cms. from the height of the associated cassette. The adjustment of the vertical screening plates 123 and 124 according to the width of the tube is effected by introducing the corresponding cassette 13 x 24 broadside and slipping-in the screening plate 140.

In the case of screening plates with adjustable screening surface it is evident that a separate potentiometer can also be provided which can be switched into the bridge system instead of the potentiometer 132 and is adjustable according to the width of the screening plates.

The same applies when several compression tubes of different sizes are coordinated to the target apparatus.

The controlling mechanisms above described only become operative for the adjusting motors after the switch 131, already described in connection with Fig. 4, has been actuated, the two switching contacts 131a and 131b of this switch being provided each in a current feeding wire leading to the two bridge systems. Further contacts 146a and 146b, which are automatically closed when making an exposure, are connected in parallel with the contacts 131a and 131b, so that the screening of the ray beam according to the size of the cassette takes place in any case during the interval of delay before the X-ray tube is switched on.

During the operation of the switch 131, the radioscopic voltage of the X-ray tube is preferably switched off automatically to relieve the patient as long as the adjusting motors are running. The reillumination of the luminous screen shows the doctor that the adjustment has taken place. The switching mechanism for this measure is indicated by the contacts 147 and 148 of the relays 143 and 144.

The switching elements according to the invention can be utilized in connection with the arbitrary setting of the near-focus screening plates, that is when the switch 131 is in the position "free operation," in such a manner that the ray beam is, in known manner, not opened wider than corresponds with the size of the image carrier. With the aid of Fig. 6 this idea is explained in connection with a switching arrangement for the adjusting motor 127 of the screening plates 123 and 124 which constitutes a development of the system illustrated in Fig. 5.

In the "free operation" position a relay 153 is rendered available in the bridge arm instead of the relay 142 and a resistance 154 in the control bridge system for the motor 127 instead of the potentiometer 132 by means of the switch 131 through the intermediary of the contacts 151 and 152. Thus the contacts 143a become inoperative for switching on the motor 127. The switching on of the voltage for driving the motor is then effected by a switch 155. The contact 153a of the relay 153 and a contact 156a of a suitable relay (not shown) for the controlling system of the screening plates 125 and 126, are located in the switching circuit for the radioscopic voltage and switch this off when the screening plates, taking into consideration the distance between the focus and the luminous screen, have opened too far so that the doctor has to close the screening plates further. It is evident that it is also possible to construct the switching arrangement in such a manner that the adjustment of the screening plates is blocked when, on the adjusting motor being operated, the released ray beam reaches the edge of the luminous screen or that the screening plates automatically narrow the ray beam when it extends beyond the edge of the luminous screen on the distance between the focus and luminous screen becoming less or the examining apparatus being taken into operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for producing radiograph target pictures by selectively employing X-ray sensitive material respectively contained in cassettes of respectively different size, said apparatus comprising a housing, carrier means for carrying a desired one of said cassettes, means in said housing for shifting the cassette employed from a position outside the X-ray beam cone into a position within such X-ray beam cone and back again, X-ray opaque shutter means, and an automatically controlled device for setting said shutter means with respect to the field of exposure, said device comprising an element cooperatively associated with said cassette carrier for engaging the leading edge of the cassette employed as seen in the direction of motion of said cassette incident to the insertion thereof into said carrier means, means for effecting a relative motion between said carrier and said element, and means for transmitting said relative motion to said shutter setting means so as to effect the automatic setting thereof.

2. Apparatus according to claim 1, comprising holding means for the cassette which is to be employed, said holding means respectively cooperatively associated with different cassette positions, means for selecting the holding means which is to become operative for the cassette to be employed, and means for automatically controlling said selecting means in accordance with the magnitude of relative motion between said cassette carrier and the element engaging the leading edge of the cassette employed.

3. Apparatus according to claim 1, wherein said housing is cooperatively associated with an X-ray protection casing of the X-ray tube, said housing containing electric motor means for the setting of said device, and control means for automatically governing said motor means in accordance with the magnitude of relative motion between said cassette carrier and said leading edge of the cassette employed, said control means comprising potentiometer means disposed in the circuit of said motor means and a member partaking in the setting motion which is coupled with said potentiometer means.

References Cited in the file of this patent
UNITED STATES PATENTS

| 1,953,497 | Nelson | Apr. 3, 1934 |
| 2,552,858 | Mueller et al. | May 15, 1951 |
| 2,567,363 | Blatz | Sept. 11, 1951 |